United States Patent [19]

DeMarti, Jr.

[11] Patent Number: 5,083,153
[45] Date of Patent: Jan. 21, 1992

[54] FILM TRANSPORTING APPARATUS

[75] Inventor: Jack C. DeMarti, Jr., Rochester, N.Y.

[73] Assignee: Eastman Kodak Company, Rochester, N.Y.

[21] Appl. No.: 568,802

[22] Filed: Aug. 17, 1990

[51] Int. Cl.⁵ .............................................. G03B 27/52
[52] U.S. Cl. ........................................ 355/40; 355/77
[58] Field of Search .............. 355/40, 75, 77; 360/88, 360/104

[56] References Cited

U.S. PATENT DOCUMENTS

| | | | |
|---|---|---|---|
| 4,002,887 | 1/1977 | Ouimette | 235/61.11 |
| 4,112,470 | 9/1978 | Yamauchi | 360/88 |
| 4,181,920 | 1/1980 | Cerekas | 360/88 |
| 4,774,553 | 9/1988 | Blanding et al. | 355/75 |

Primary Examiner—L. T. Hix
Assistant Examiner—D. Rutledge
Attorney, Agent, or Firm—Marianne J. Twait

[57] ABSTRACT

A photographic film is transported by a pair of endless belts past an exposure aperture and a pair of magnetic heads. The heads are mounted in a film platen in alignment with the belts so that the belts provide backup support to the film during recording and/or reading information on the film.

8 Claims, 2 Drawing Sheets

FILM TRANSPORTING APPARATUS

CROSS-REFERENCE TO RELATED APPLICATIONS

Reference is made to the following commonly assigned copending applications:

(1) U.S. Ser. No. 522,395, entitled CAMERA APPARATUS FOR MAGNETICALLY RECORDING ON FILM, and filed Apr. 20, 1990, in the name of Douglas H. Pearson, which is a Continuation of U.S. Ser. No. 427,210 filed Oct. 24, 1989 now abandoned, which is a Continuation of U.S. Ser. No. 282,419 filed Dec. 9, 1988 now abandoned; and (2) U.S. Ser. No. 391,205, entitled MAGNETIC HEAD SUSPENSION APPARATUS, and filed Aug. 9, 1989, in the names of Jack C. DeMarti and John G. Weigand; and (3) U.S. Ser. No. 391,746, entitled MAGNETIC HEAD SUSPENSION APPARATUS, and filed Aug. 9, 1989, in the names of Jack C. DeMarti and John G. Weigand; and (4) U.S. Ser. No. 255,693, entitled FILM INFORMATION EXCHANGE SYSTEM USING DEDICATED MAGNETIC TRACKS OR FILM, and filed Oct. 7, 1988, in the names of Robert P. Cloutier and William C. Atkinson.

1. Field of the Invention

This invention relates to apparatus for transporting photographic film to a printing aperture of a photographic printer and to apparatus for recording and/or reading information on magnetic surfaces of the film.

2. Background Information

In a photographic printer, negatives to be printed must be accurately aligned with a printing aperture. It is desirable to transport the negatives to the aperture with minimum operator assistance. U.S. Pat. No. 4,774,553, issued Sept. 27, 1988, discloses a photographic printing apparatus which includes a pair of film moving belts for guiding a filmstrip to a printing gate.

Belt drive systems can also be used for transporting a magnetic tape past a magnetic head for recording and/or reading information to/from the magnetic tape. U.S. Pat. No. 4,112,470, issued Sept. 5, 1978, discloses a system for reproducing information recorded on a recording tape. An endless belt guides the recording tape over a playback head.

SUMMARY OF THE INVENTION

Utilizing magnetic heads for reading and/or writing information from/to photographic film in photofinishing equipment has been proposed, e.g. U.S. Ser. No. 255,693 cross-referenced above. This poses a unique problem of how to design and manufacture a low cost, reliable photofinishing apparatus having a magnetic read/write head.

A photographic printer having means to transport successive images on the negative past a printing aperture and having separate means to support the magnetic tracks on the film in operative relationship with a magnetic head would be a complex, costly apparatus with low reliability. Heretofore, no references have been found which suggest having a belt means simultaneously perform functions related to a magnetic head and a printing aperture.

Therefore, in accordance with the present invention, belt means transports successive image areas recorded on a photographic film having a magnetic information track over a printing aperture. This same belt mean supports the magnetic track on the photographic film in reading and/or recording relationship with a magnetic head located proximate one side of the printing aperture. Thus, the present invention provides a low cost, reliable photographic printer.

BRIEF DESCRIPTION OF THE DRAWINGS

Other advantages will become apparent from the following detailed description taken in connection with the accompanying drawings wherein.

DETAILED DESCRIPTION OF THE PREFERRED EMBODIMENT

Because photographic printers and the general operations associated therewith are well known in the art, the description hereinafter will be directed in particular only to those printer parts relevant to the present invention. It is to be understood, however, that printer components not specifically shown or described may take various forms selectable from those known in the art.

Figure 1:
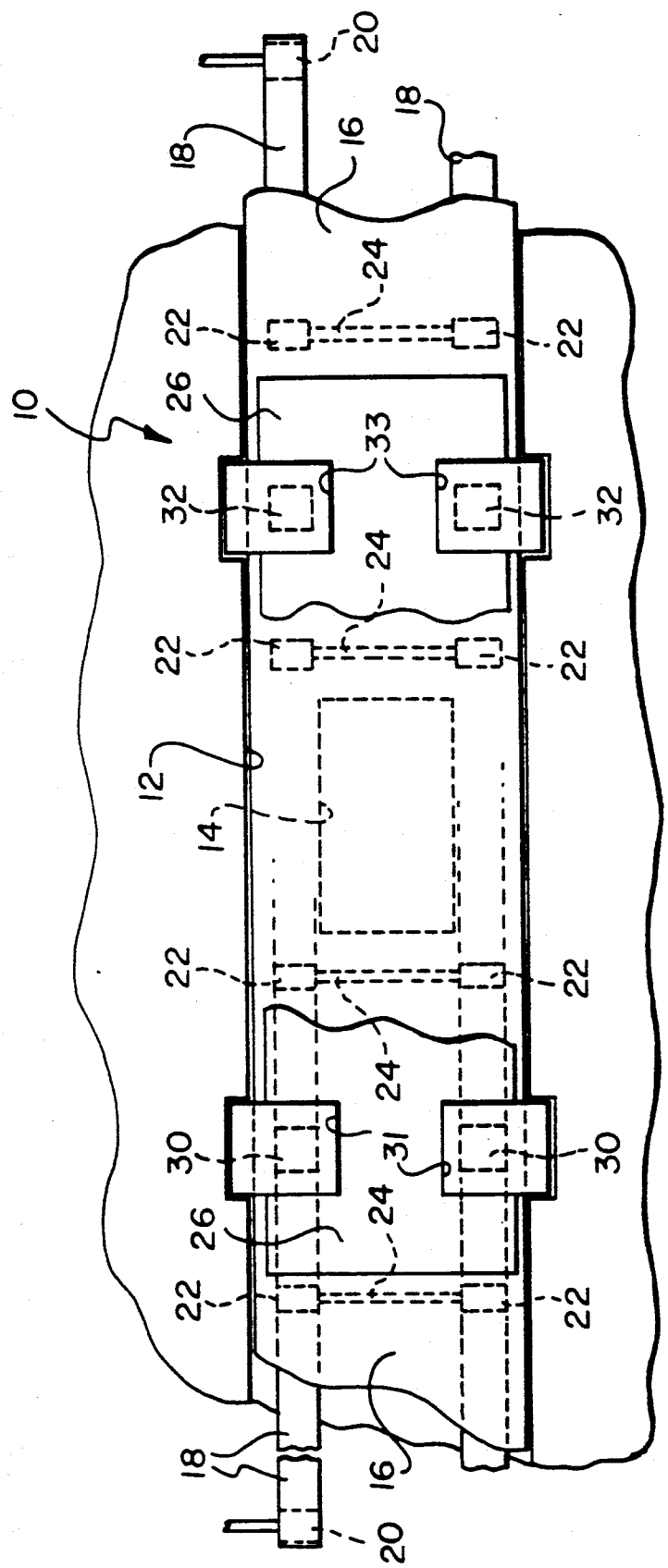
FIG. 1 is a plan view of a film transport apparatus in accordance with the invention.

Referring to FIG. 1, there is shown schematically an elongated structure 10 defining a film guide channel 12 extending along a work area such as a printing aperture 14. A photographic film 16 is transported through the channel by a pair of spaced, parallel belts 18 which are positioned in alignment with information tracks along the edges of the film. According to the preferred embodiment the information tracks are magnetic surfaces coated on the film. As shown most clearly in FIG. 2, each belt 18 is endless and extends around a pair of rollers 20. The belts 18 may be driven by the rollers 20 or other suitable drive means. To maintain the belts 18 in a predetermined plane, idler pinch rollers 22 coupled by a shaft 24 are positioned between the upper and lower belt segments at spaced intervals along the film path. The pinch rollers 22 provide a force to the belts to maintain acceptable contact between the magnetic heads and the magnetic surface on the film during recording and/or reading operations. Any conventional means can be used to mount the pinch rollers 22 in the printer to achieve the required force. This force can vary depending on the elements in the assembly and the physical tolerances in the assembly.

A film reference plate or platen 26 is mounted above the film path by a suitable supporting means (not shown). The plate 26 is provided with two integral rails 28 which are spaced to overlay the belts 18 respectively. The rails 28 are positioned above the belts by a distance slightly exceeding the thickness of the film so that the film can be transported by the belts 18.

To complete the assembly, a pair of magnetic write heads 30 are supported in rectangular shaped notches 31, formed in the platen 26 at one side of the aperture 14 and a pair of read heads 32 are supported in rectangular shaped notches 33 formed in the platen 26 at the other side of the aperture. The heads are spaced as shown in FIG. 1 to also overlay the belts 18 so that the belts provide a backing to insure good contact between the heads and the magnetic surface of the film to obtain accurate reading and/or recording of information on the magnetic tracks.

Figure 2:
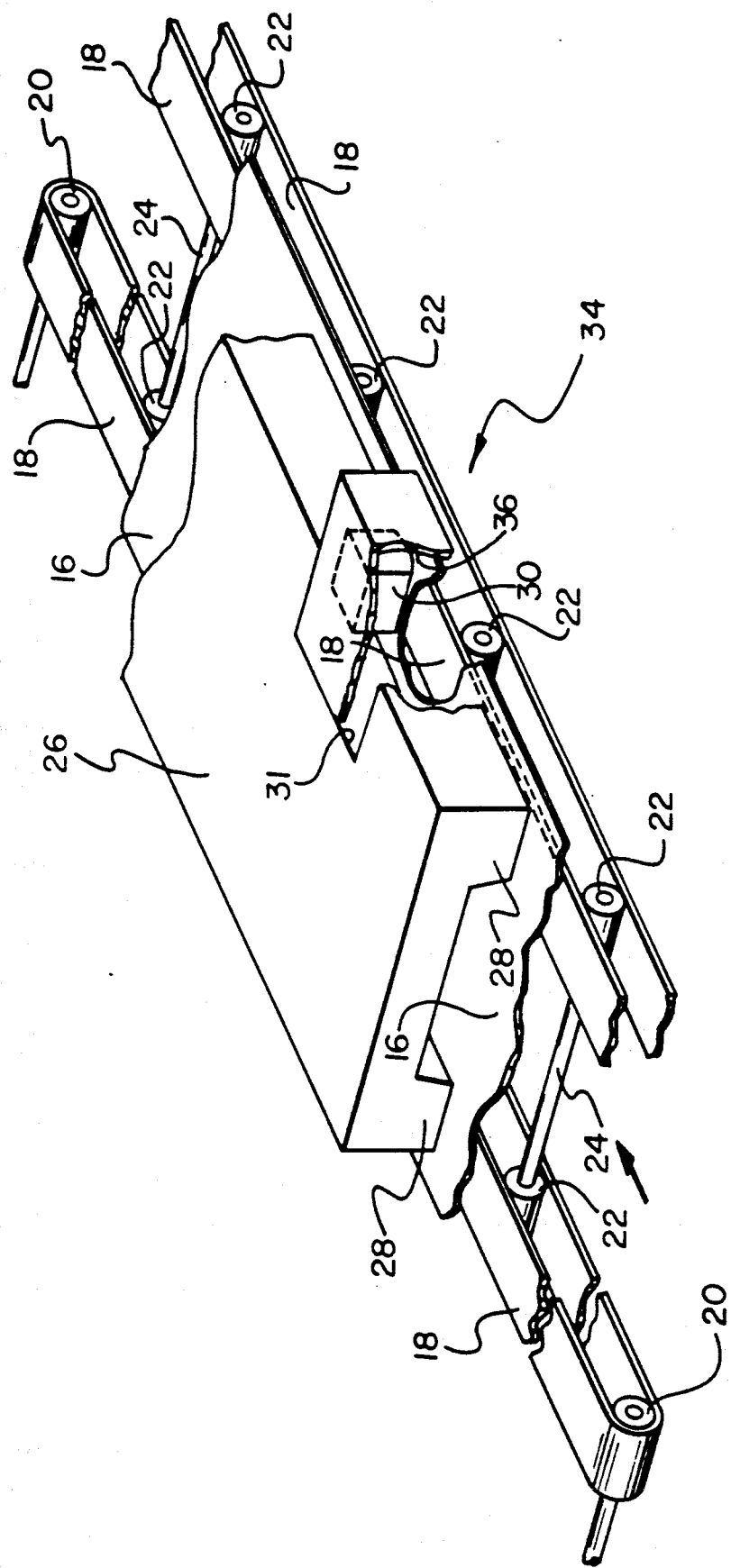
FIG. 2 is a perspective view of the apparatus shown in FIG. 1 with some of the parts cut away.

Preferably, the heads 30 and 32 are each mounted in a carriage assembly 34 (FIG. 2) having a film edge follower surface 36. The carriage assembly 34 is positioned in the rectangular shaped notches 31, 33 formed in the platen 26. Only one carriage assembly is shown in FIG. 2, it being understood that the others can be identical. Preferably, each carriage is biased by a leaf spring (not shown) to urge its edge follower surface 36 into engagement with the film edge. Such a follower assembly may take the form of those disclosed in the copending applications cross-referenced above, the disclosures of which are incorporated herein by reference.

In operation, the belts 18 will be driven by any suitable means to transport the film 16 past the printing aperture 14 in the direction indicated by the arrow keeping the film accurately aligned with the aperture 14. The drive means would include means for indexing the film relative to the aperture 14 such as by perforation or frame line detection. Such apparatus is well known to those skilled in the art and a specific disclosure is deemed unnecessary.

As the belt continues to transport the film, the information tracks on the film move under the heads 30, 32, and the support of the belts provides the contact pressure between the heads and the film to enable information to be accurately recorded and/or read.

The invention thus provides a simple reliable apparatus for both transporting photographic film past a printing aperture and for simultaneously recording and/or reading information on the film.

The invention described heretofore is not limited to use in a photographic printer. The belt means which simultaneously transports photographic film and supports a magnetic information track in a read and/or write relationship with a magnetic head has applicability in other photofinishing equipment. An example is a photographic film processor wherein the belts transport the film having successive image areas through means defining a work area, such as a plurality of processing tanks, and simultaneously supports a magnetic information track on the film in a read and/or write relationship with a magnetic head positioned near the processing tanks.

The invention has been described in detail with particular reference to a presently preferred embodiment, but it will be understood that variations and modifications can be effected within the spirit and scope of the invention.

I claim:

1. A photographic printing apparatus for use with a photographic film having a magnetic information track and successive image areas, said printing apparatus comprising:
   means defining a printing aperture;
   a magnetic head located proximate one side of said printing aperture for reading and/or recording information on a magnetic information track of a photographic film; and
   belt means for transporting successive image areas of a photographic film over said printing aperture and simultaneously for supporting a magnetic information track on a photographic film in reading and/or recording relationship with said magnetic head.

2. A photographic printing apparatus as defined in claim 1, further comprising:
   a magnetic head positioned proximate another side of said printing aperture for reading and/or recording information on a magnetic information track of a photographic film.

3. A photographic printing apparatus as defined in claim 1, wherein said magnetic head is located proximate one side of said aperture only for reading information from a magnetic track of a photographic film, and further comprising:
   another magnetic head located proximate another side of said printing aperture opposite said one side of said printing aperture only for recording information on a magnetic track on a photographic film.

4. A photographic printing apparatus as defined in claim 1, wherein said belt means includes a pair of spaced apart endless belts, at least one of which is located in alignment with a magnetic information track on a photographic film when the photographic film is transported by said belt means.

5. A film transporting apparatus for use with a photographic film having a magnetic information track and successive image areas, said transporting apparatus comprising:
   means defining a viewing aperture;
   a magnetic head located proximate one side of said viewing aperture for reading and/or recording information on a magnetic information track of a photographic film; and
   belt means for transporting successive image areas of a photographic film over said viewing aperture and simultaneously for supporting a magnetic information track of a photographic film in reading and/or recording relationship with said magnetic head.

6. A film transporting apparatus as defined in claim 5, wherein said belt means includes a pair of spaced apart endless belts, at least one of which is located in alignment with a magnetic information track on a photographic film when the photographic film is transported by said belt means.

7. A photofinishing apparatus for use with a photographic film having a magnetic information track and successive image areas, said photofinishing apparatus comprising:
   means defining a work area for use with successive images on a photographic film;
   a magnetic head located proximate one side of said work area for reading and/or recording information on a magnetic information track on a photographic film; and
   belt means for transporting successive image areas of a photographic film through said work area and simultaneously for supporting a magnetic information track on a photographic film in reading and/or recording relationship with said magnetic head.

8. A photofinishing apparatus as defined in claim 7, wherein said belt means includes a pair of spaced apart endless belts, at least one of which is located in alignment with a magnetic information track on a photographic film when the photographic film is transported by said belt means.

* * * * *